United States Patent
Utsumi

(10) Patent No.: US 8,742,017 B2
(45) Date of Patent: Jun. 3, 2014

(54) ANTISTATIC AGENT AND RESIN COMPOSITION CONTAINING SAME

(75) Inventor: Tetsuhiro Utsumi, Sodegaura (JP)

(73) Assignee: Toho Chemical Industry Co., Ltd., Tokyo (JP)

( * ) Notice: Subject to any disclaimer, the term of this patent is extended or adjusted under 35 U.S.C. 154(b) by 21 days.

(21) Appl. No.: 13/521,135

(22) PCT Filed: Jan. 7, 2011

(86) PCT No.: PCT/JP2011/050194
§ 371 (c)(1),
(2), (4) Date: Jul. 9, 2012

(87) PCT Pub. No.: WO2011/083850
PCT Pub. Date: Jul. 14, 2011

(65) Prior Publication Data
US 2012/0283386 A1    Nov. 8, 2012

(30) Foreign Application Priority Data
Jan. 8, 2010  (JP) ................ 2010-003419

(51) Int. Cl.
*C08L 53/00* (2006.01)
*C08L 23/26* (2006.01)
*C08F 8/44* (2006.01)
*C08F 8/46* (2006.01)
*C08F 293/00* (2006.01)

(52) U.S. Cl.
USPC ................ 525/91; 525/90; 525/185; 525/187

(58) Field of Classification Search
USPC .......................................... 525/90, 185, 187
See application file for complete search history.

(56) References Cited

U.S. PATENT DOCUMENTS

2008/0293886 A1 * 11/2008 Karl et al. .................. 525/89

FOREIGN PATENT DOCUMENTS

| DE | 10321734 A1 * | 12/2004 |
|---|---|---|
| JP | A-60-233131 | 11/1985 |
| JP | A-11-170456 | 6/1999 |
| JP | B2-3077847 | 6/2000 |
| JP | A-2001-278985 | 10/2001 |
| JP | A-2002-284880 | 10/2002 |
| JP | A-2003-238945 | 8/2003 |
| JP | A-2006-188678 | 7/2006 |

OTHER PUBLICATIONS

Feb. 22, 2011 Search Reoprt issued in International Patent Application No. PCT/JP2011/050194 (with translation).

* cited by examiner

*Primary Examiner* — Fred M Teskin
(74) *Attorney, Agent, or Firm* — Oliff PLC

(57) ABSTRACT

There is provided an antistatic agent that preserves its antistatic property for a long period of time and has the appearance and the transparency that are not impaired when kneaded into a resin, and a resin composition containing the antistatic agent. An antistatic agent including a block copolymer which is obtained from a reaction product of a polyolefin (a) having one end being acid-modified and a diol and/or a diamine (b) having a polyoxyalkylene chain, and in which a part or all of acid groups remaining in the reaction product is neutralized with an alkaline substance. A thermoplastic resin composition including the antistatic resin. A film or sheet including the thermoplastic resin composition.

12 Claims, No Drawings

US 8,742,017 B2

ANTISTATIC AGENT AND RESIN COMPOSITION CONTAINING SAME

TECHNICAL FIELD

The present invention relates to an antistatic agent and a resin composition containing the same. Specifically, the present invention relates to an antistatic agent having an antistatic property and having transparency and appearance that are not impaired when the agent is mixed with a resin, a resin composition containing the antistatic agent, and a film and a sheet that include the resin composition.

BACKGROUND ART

Synthetic resins, which have excellent features, are generally used in various applications such as molded articles and films. However, a synthetic resin product is highly prone to be electrostatically charged due to its hydrophobicity, and therefore has many drawbacks such as foreign matter and dust adhering to the product to deteriorate the appearance, an electrical problem that occurs during processing, and a malfunction that occurs when the product is used in electronic equipment.

Conventionally, in order to solve these drawbacks, a method of adding various surfactants such as anionic surfactants, cationic surfactants, and nonionic surfactants has been practically used. This method of adding a surfactant gives an excellent antistatic property to the product for a short period of time after formation thereof; however, it is difficult to preserve such property for a long period of time because a surfactant that had bled out on the surface of the product is lost by friction, washing with water, or the like. Furthermore, the synthetic resin product is subjected to a high temperature during formation, which causes thermal decomposition of a part of the surfactant. This leads to smoking during formation, discoloration of the product, and the like. In a multilayer film and sheet of a synthetic resin, an antistatic agent must be added not only to a surface layer but also to a core layer for antistatic performance, resulting in an increase of the addition amount thereof, which is economically disadvantageous.

In recent years, in order to solve these drawbacks and problems involved in surfactant use, a polymer antistatic agent in which polyetheresteramide as a main component and an acid-modified polyolefin and the like as a third component are mixed (Patent Document 1) and a polymer antistatic agent having a cationized maleimide structure (Patent Document 2) are suggested, none of which, however, has adequate performance. A polymer antistatic agent in which a modified polyolefin and a multifunctional hydrophilic group are copolymerized (Patent Documents 3, 4) is also suggested, which has, however, a problem of being inconsistent in its performance in a film and a sheet although being effective in a molded article. In particular, in the case of using the film as a component in a touch panel, a polarizer, or the like, high optical uniformity is required of the film. However, the film has inadequate appearance and transparency with a streak, fish eye, and/or the like.

RELATED ART DOCUMENTS

Patent Documents

Patent Document 1: Japanese Patent Application Publication No. JP-A-11-170456 (page 2)
Patent Document 2: Japanese Patent No. 3077847 (pages 1 to 2)
Patent Document 3: Japanese Patent Application Publication No. JP-A-2001-278985 (pages 2 to 5)
Patent Document 4: Japanese Patent Application Publication No. JP-A-2002-284880 (pages 2 to 3)

SUMMARY OF THE INVENTION

Problem to be Solved by the Invention

An object of the present invention is to provide an antistatic agent that preserves its antistatic property for a long period of time and has the appearance and the transparency that are not impaired when kneaded into a resin, and a resin composition containing the same.

Means for Solving the Problem

The inventor of the present invention has conducted intensive research and, as a result, found that an antistatic agent including a particular block copolymer can achieve the above object. Thus, the inventor of the present invention has now completed the present invention.

That is, the present invention relates to an antistatic agent that includes a block copolymer which is obtained from a reaction product of a polyolefin (a) having one end being acid-modified and a diol and/or a diamine (b) having a polyoxyalkylene chain, and in which a part or all of the acid groups (acid radicals) remaining in the reaction product is neutralized with an alkaline substance.

The polyolefin (a) having one end being acid-modified is preferably obtained by modifying one end of the polyolefin with an α,β-unsaturated carboxylic acid or an anhydride thereof.

Among examples of the antistatic agent, one in which the polyolefin (a) having one end being acid-modified is polybutenyl succinic acid is preferable.

The diol and/or the diamine (b) having a polyoxyalkylene chain is preferably a polyether diol obtained by adding an alkylene oxide to a diol compound.

The block copolymer is preferably a copolymer having an (A)-(B)-(A) structure, an (A)-(B) structure, or both of these structures, composed of a block (A) derived from the polyolefin (a) having one end being acid-modified and a block (B) derived from the diol and/or the diamine (b) having a polyoxyalkylene chain being bonded together.

Alternatively, among examples of the antistatic agent, a preferable antistatic agent is one in which the polyolefin (a) having one end being acid-modified is a polyolefin that is a maleic anhydride-modified polypropylene, and a more preferable antistatic agent is one in which the polypropylene has an average number of terminal double bonds per molecule of 1.0 or less.

The diol and/or diamine (b) having a polyoxyalkylene chain is preferably a polyether diol obtained by adding an alkylene oxide to a diol compound.

The block copolymer is preferably a copolymer having an (A)-(B)-(A) structure, an (A)-(B) structure, or both of these structures, composed of a block (A) derived from the polyolefin (a) having one end being acid-modified and a block (B) derived from the diol and/or the diamine (b) having a polyoxyalkylene chain being bonded together.

Another aspect of the present invention includes an antistatic agent that includes a block copolymer of Formula (1):

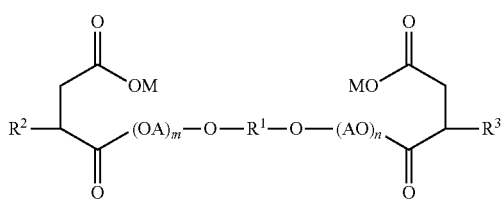

(where $R^1$ is a residue that results from removing a hydroxy group from a diol, A is a $C_{2-4}$ alkylene group, m and n are independently an integer of 1 to 100, each of $R^2$ and $R^3$ is a polyolefin residue, and M is an alkali metal, an alkaline-earth metal, ammonium, or organic ammonium).

The present invention also includes an antistatic agent that includes a block copolymer having a structure of Formula (2):

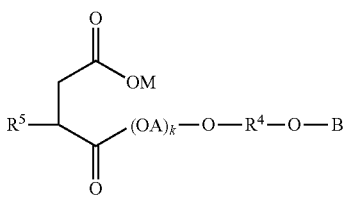

(where $R^4$ is a residue that results from removing a hydroxy group from a diol compound, A is a $C_{2-4}$ alkylene group, k is an integer of 1 to 100, $R^5$ is a polyolefin residue, M is an alkali metal, an alkaline-earth metal, ammonium, or organic ammonium, and B is a hydrogen atom or a structure of Formula (3):

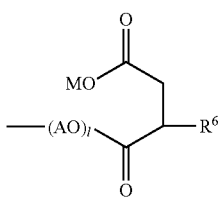

A is a $C_{2-4}$ alkylene group, l is an integer of 1 to 100, $R^6$ is a polyolefin residue, and M is an alkali metal, an alkaline-earth metal, ammonium, or organic ammonium)).

The present invention also includes an antistatic resin composition characterized by containing the antistatic agent and a thermoplastic resin, and a film or a sheet that includes the resin composition.

Effects of the Invention

The antistatic agent of the present invention is excellent in workability when mixed with, a resin to form a film, a sheet, or the like, and the obtained film, sheet, or the like retains excellent antistatic performance for a long period of time and is also excellent in appearance and transparency.

MODES FOR CARRYING OUT INVENTION

The present invention relates to an antistatic agent that includes a block copolymer which is obtained from a reaction product of a polyolefin (a) having one end being acid-modified and a diol and/or a diamine (b) having a polyoxyalkylene chain, and in which a part or all of the acid groups remaining in the reaction product is neutralized with an alkaline substance.

The present invention will be described in detail.

[Polyolefin (a) Having One End being Acid-Modified]

The polyolefin (a) having one end being acid-modified can be obtained, for example, by modifying one end of the polyolefin with an α,β-unsaturated carboxylic acid or an anhydride thereof.

The polyolefin that can be used is a polyolefin obtained by polymerizing a mixture of one, two, or more species of $C_{2-30}$ olefins, preferably $C_{2-12}$ olefins, and further preferably $C_{2-10}$ olefins (polymerization method), and a low molecular weight-polyolefin obtained by thermal degradation of a high molecular weight-polyolefin (thermal degradation). The number average molecular weight, Mn, of the polyolefin is preferably 100 to 10,000, is more preferably 300 to 7,000, and is most preferably 500 to 5,000.

Examples of the $C_{2-30}$ olefins include ethylene, propylene, 1-butene, 2-butene, and isobutene; $C_{5-30}$ α-olefins, preferably $C_{5-12}$ α-olefins, and further preferably $C_{5-10}$ α-olefins, such as 4-methyl-1-pentene, 1-pentene, 1-octene, 1-decene, and 1-dodecene; and $C_{4-30}$ dienes, preferably $C_{4-18}$ dienes, and further preferably $C_{4-8}$ dienes, such as butadiene, isoprene, cyclopentadiene, and 11-dodecadiene; and the like.

Preferable examples of a polyolefin having one end being modifiable include polyethylenes, polypropylenes, polyisobutylenes, and the like in which the average number of terminal double bonds per molecule is usually 0.5 to 1.5 and is preferably 0.7 to 1.0.

Examples of the α,β-unsaturated carboxylic acid or an anhydride thereof that is used in acid-modification of the polyolefin include monocarboxylic acids, dicarboxylic acids, and anhydrides thereof, such as (meth)acrylic acid, maleic acid (maleic anhydride), fumaric acid, itaconic acid (itaconic anhydride), citraconic acid (citraconic anhydride), and the like. Preferable among these are fumaric acid and maleic acid (maleic anhydride).

Examples of a method for acid-modifying one end of the polyolefin include a method where a polyolefin having one end being modifiable, an α,β-unsaturated carboxylic acid or an anhydride thereof, and, where appropriate, an organic peroxide are charged into a stainless steel autoclave, which is then subjected to replacement with nitrogen, and the resultant is subjected to a reaction at a reaction temperature of 150 to 250° C. The reaction is preferably performed by heat modification using no organic peroxide for synthesizing an (A)-(B)-(A) block copolymer or an (A)-(B) block copolymer. The amount of the α,β-unsaturated carboxylic acid or an anhydride thereof used in modification is usually 20 to 0.1% and is preferably 10 to 0.5% based on the mass of the polyolefin. The reaction may also be performed by a fusion method or a solution method.

The degree of acid-modification per molecule of the polyolefin having an end being acid-modified can be determined from the number average molecular weight, Mn, obtained by GPC and the acid value or the saponification value of the polyolefin. The degree of acid-modification is preferably 0.5 to 1.5 and is more preferably 0.7 to 1.0 for synthesizing a block copolymer having an (A)-(B)-(A) structure or an (A)-(B) structure composed of a block (A) derived from the polyolefin (a) having one end being acid-modified and a block (B) derived from the diol and/or the diamine (b) having a polyoxyalkylene chain being bonded together, which is described below.

A preferable polyolefin (a) having one end being acid-modified is a polybutenyl succinic acid because only one end thereof is acid-modified and an (A)-(B)-(A) block copolymer or an (A)-(B) block copolymer is easily obtained therefrom. The polybutenyl succinic acid includes poly(iso)butenyl succinic anhydride (PIBSA). PIBSA can be obtained by subjecting an isobutene homopolymer or poly(iso)butene that is a copolymer of isobutene and n-butene to a reaction with maleic anhydride, and is characterized in that only one end thereof is maleinized, as shown in the chemical formula below.

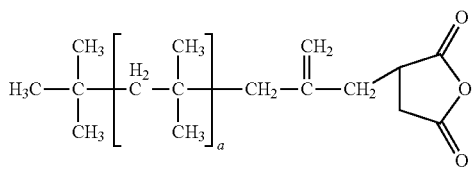

In the formula, a is the number of repeating units.

In the case of a common, acid-modified polyolefin, not a few polyolefin components are produced as a byproduct during acid-modification of only one end of the polyolefin, which have both ends being acid-modified, and therefore forms, in addition to an (A)-(B)-(A) block copolymer or an (A)-(B) block copolymer, a high molecular weight-product in which a block (A) and a block (B) are repeatedly and alternately bonded, resulting in impaired compatibility with a resin. In contrast to this, using a polyolefin, such as PIBSA, having only one end being acid-modified, an (A)-(B)-(A) block copolymer or an (A)-(B) block copolymer having an antistatic effect can be obtained with high purity.

Examples of the polyolefin (a) having one end being acid-modified include a product derived from modifying a polypropylene having an average number of terminal double bonds per molecule of 1.0 or less with maleic anhydride, shown below.

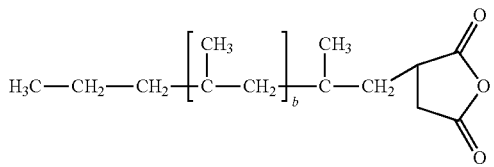

In the formula, b is the number of repeating units.

[Dial and/or Diamine (b) Having Polyoxyalkylene Chain]

From the viewpoints of an antistatic property and the like, the diol and/or the diamine (b) having a polyoxyalkylene chain contains preferably 20 to 100% by mass, further preferably 50 to 100% by mass, and particularly preferably 70 to 100% by mass of polyoxyalkylene unit relative to the total mass of the component (b). Examples of the component (b) include a polyether diol, a polyether diamine in which the hydroxy groups of a polyether diol have been converted to amino groups, and the like.

The polyether diol is obtained by adding an alkylene oxide to a diol compound, and examples thereof include polyethylene glycol, polypropylene glycol, and a compound of a formula H—(OA)m-O—R—O-(AO)n-H, for example. In the formula, R is a residue that results from removing a hydroxy group from a diol compound, A is a $C_{2-4}$ alkylene group, and each of m and n is the number of alkylene oxides added to a hydroxy group of the diol. The n o (OA)s and the n (AO)s may be the same oxyalkylene groups or different oxyalkylene groups. In the case where they are composed of two or more oxyalkylene groups, they may be bonded in blocks, at random, or in a combination of these. Each of m and n is usually an integer of 1 to 100, is preferably an integer of 2 to 30, and is particularly preferably an integer of 3 to 10, and m and n may be the same or different from each other.

Examples of the diol compound include dihydric alcohols ($C_{2-12}$ aliphatic, alicyclic, or aromatic dihydric alcohols, for example), $C_{6-18}$ dihydric phenols, and diols containing a tertiary amino group.

Examples of the aliphatic dihydric alcohols include alkylene glycols (ethylene glycol, propylene glycol), 1,4-butanediol, 1,6-hexanediol, neopentyl glycol, and 1,12-dodecanediol. Examples of the alicyclic dihydric alcohols include cyclohexanedimethanol and hydrogenated bisphenol, and examples of the aromatic dihydric alcohols include xylylenediol and the like.

Examples of the dihydric phenols include monocyclic dihydric phenols (hydroquinone, catechol, resorcin, thiols, and the like), bisphenols (bisphenol A, bisphenol F, bisphenol S, 4,4'-dihydroxydiphenyl-2,2-butane, dihydroxybiphenyl, and the like), and condensed polycyclic dihydric phenols (dihydroxynaphthalene, binaphthol, and the like).

Examples of the diols containing a tertiary amino group include bishydroxyalkylates of $C_{1-30}$ aliphatic or alicyclic primary monoamines (methylamine, ethylamine, cyclopropylamine, 1-propylamine, 2-propylamine, amylamine, isoamylamine, hexylamine, 1,3-dimethylbutylamine, 3,3-dimethylbutylamine, 2-aminoheptane, 3-aminoheptane, cyclopentylamine, hexylamine, cyclohexylamine, heptylamine, nonylamine, decylamine, undecylamine, dodecylamine, and the like), and bishydroxyalkylates of $C_{6-12}$ aromatic primary monoamines (aniline, benzylamine, and the like).

Among these diol compounds, aliphatic dihydric alcohols and bisphenols are preferable and ethylene glycol and bisphenol A are particularly preferable.

Examples of the alkylene oxide that is added to the diol compound include $C_{2-4}$ alkylene oxides such as ethylene oxide, propylene oxide, and butylene oxide, and one, two, or more of these can be used. Addition of the alkylene oxide is performed in the presence of an alkaline catalyst, for example, and at a temperature of 100 to 200° C.

Specifically, examples of the polyether diol (b) that is preferably used in the present invention can include polyethylene glycols having a molecular weight of 300 to 2,000 and more preferably 500 to 1,000, bisphenol A-ethylene oxide adducts, and the like.

The polyether diamine is obtained by converting the hydroxy groups of the polyether diol to amino groups by a known method, and examples thereof include a compound of a formula $H_2N$-A'-(OA)m-O—R—O-(AO)n-A'-$NH_2$. In the formula, each of R, A, m, and n is the same as these exemplified above for the polyether diol, and A' is a $C_{2-4}$ alkylene group.

[Block Copolymer]

The block copolymer according to the present invention is obtained from a reaction product of the polyolefin (a) having one end being acid-modified and the diol and/or the diamine (b) having a polyoxyalkylene chain, and is characterized in that a part or all of the acid groups remaining in the reaction product is neutralized with an alkaline substance. In the case where (a) is a polyolefin having one end being modified with maleic anhydride, a reaction between (a) and (b) leads to ring-opening of a maleic anhydride-derived structure in (a), a remaining free carboxy group is then neutralized with an alkaline substance to form a salt, and therefore a block copolymer to be obtained is a half ester.

The reaction of the polyolefin (a) having one end being acid-modified and the diol and/or the diamine (b) having a polyoxyalkylene chain can be performed in the presence of a catalyst at 150 to 250° C. The catalyst may be an acid catalyst or an alkaline catalyst, and is preferably an alkaline catalyst because it can also be used in neutralization of an acid group. As the alkaline catalyst, alkaline substances exemplified below as an alkaline substance for use in neutralization of an acid group can be preferably used.

The catalyst that may be used is an antimony catalyst such as antimony trioxide; a tin catalyst such as monobutyltin oxide; a titanium catalyst such as tetrabutyl titanate; a zirconium catalyst such as tetrabutyl zirconate; an organic acid metal salt-based catalyst such as zirconyl acetate and zinc acetate; a palladium catalyst such as palladium acetate and tetrakis(triphenylphosphine)palladium; and a combination of two or more of these. Among these, a zirconium catalyst and an organic acid metal salt-based catalyst are preferable and zirconyl acetate is particularly preferable. When using such an organic metal salt-based catalyst, a step of neutralizing a remaining acid group with an alkaline substance is needed, and the neutralization step may be performed before the reaction to form a block copolymer or may be performed after the reaction. Here, alkaline substances exemplified below as an alkaline substance for use in neutralization of a remaining acid group may be preferably used.

The reaction proportion of the polyolefin (a) having one end being acid-modified and the diol and/or the diamine (b) having a polyoxyalkylene chain is not particularly limited. However, it is preferable that the reaction proportion be as close to (a):(b)=2:1 in a molar ratio as possible for efficiently obtaining an (A)-(B)-(A) block copolymer, which is described below.

Examples of the alkaline substance used in neutralization of a remaining acid group include hydroxides and carbonates of alkali metals such as lithium, potassium, and sodium, hydroxides and carbonates of alkaline-earth metals such as calcium and magnesium, ammonia, organic amines, and the like, and a combination of two or more of these.

Specific and non-limitative examples thereof can be sodium hydride, potassium hydride, calcium hydride, sodium ethoxide, sodium methoxide, sodium tert-butoxide, potassium tert-butoxide, n-butyllithium, sec-butyllithium, lithium diisopropylamide, sodium amide, lithium bistrimethylsilylamide, sodium carbonate, potassium carbonate, sodium hydrogen carbonate, potassium hydrogen carbonate, lithium hydroxide, sodium hydroxide, potassium hydroxide, barium hydroxide, calcium hydroxide, sodium phosphate, potassium phosphate, calcium phosphate, sodium acetate, potassium acetate, sodium sulfate, potassium sulfate, magnesium sulfate, sodium silicate, lithium silicate, sodium tripolyphosphate, sodium ethylenediaminetetraacetate, sodium nitrilotriacetate, sodium paratoluenesulfonate, potassium paratoluenesulfonate, sodium metaborate, sodium citrate, potassium citrate, sodium ethylenediaminetetraacetate, sodium nitrilotriacetate, sodium hydroxyethylethylenediaminetriacetate, sodium diethylenetriaminepentaacetate, sodium uracil diacetate, sodium thiosulfate, and the like.

Preferable among these alkaline substances in terms of an antistatic property is hydroxides of alkali metals such as potassium and sodium.

Not all the acid groups remaining after a reaction of the polyolefin (a) having one end being acid-modified and the diol and/or the diamine (b) having a polyoxyalkylene chain are necessarily needed to form salts in the neutralization step using an alkaline substance, and the proportion of the acid groups to form such salts is preferably 30 mmol % or more and is more preferably 50 mol % or more in terms of an antistatic property. In order to neutralize more of remaining acid groups, an alkaline substance can be used in 100 mol % or more relative to the amount of remaining acid groups. The amount of alkaline substance is preferably 10 to 200 mol %, is more preferably 30 to 150 mol %, and is further preferably 50 to 100 mol %, relative to the amount of remaining acid groups. In order to decrease bleed-out at the time of using the resultant as an antistatic agent later, deaeration is preferably performed under reduced pressure after the neutralization step to remove part of the alkaline substances except for the metal salt parts.

Specific examples of a method for neutralizing a remaining acid group include a method (1) of adding an alkaline substance at the time of charging the ingredients, and performing neutralization with raising the temperature and stirring, a method (2) of adding an alkaline substance at the time when the temperature has been raised and the viscosity of the polyolefin has decreased, and a method (3) of adding an alkaline substance dropwise after a reaction of the polyolefin (a) and the diol and/or the diamine (b) having a polyoxyalkylene chain and performing neutralization. Among these, the method of performing neutralization before a reaction of (a) and (b), that is, the method (1) of adding an alkaline substance at the time of charging the ingredients is desirable because the alkaline substance can be used as a catalyst. The alkaline substance may be added as it is, or may be dissolved in water or an organic solvent and then be added dropwise. The alkaline substance is preferably dissolved in water or an organic solvent to be added dropwise in terms of facilitating the neutralization reaction.

As the block copolymer, the block copolymer having an (A)-(B)-(A) structure or an (A)-(B) structure composed of a block (A) derived from the polyolefin (a) having one end being acid-modified and a block (B) derived from the diol and/or the diamine (b) having a polyoxyalkylene chain being bonded together is preferable, and the block copolymer having an (A)-(B)-(A) structure is particularly preferable, because the appearance and the transparency of a film or a sheet are not impaired. The reason thereof is assumed that the molecular weight of the (A)-(B)-(A) block copolymer falls between that of a conventional low-molecular antistatic agent and that of a polymer antistatic agent, and therefore, in the (A)-(B)-(A) block copolymer, bleed-out, which is a problem with a low-molecular antistatic agent, does not occur and the (A)-(B)-(A) block copolymer has compatibility with a resin better than that of a polymer antistatic agent.

The (A)-(B)-(A) block copolymer includes a block copolymer of a formula below.

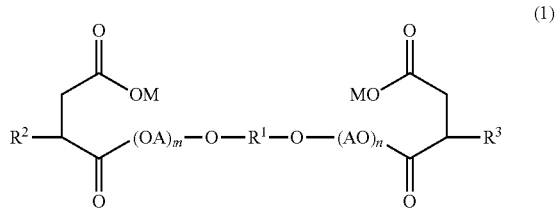

(1)

In the formula, $R^1$ is a residue that results from removing a hydroxy group from a diol, A is a $C_{2-4}$ alkylene group, m and n are independently an integer of 1 to 100, each of $R^2$ and $R^3$ is a polyolefin residue, and M is an alkali metal, an alkaline-earth metal, ammonium, or organic ammonium.

Examples of $R^1$ include a residue that results from removing a hydroxy group from the diol compound exemplified above such as dihydric alcohols ($C_{2-12}$ aliphatic, alicyclic, or aromatic dihydric alcohols, for example), $C_{6-18}$ dihydric phenols, and diols containing a tertiary amino group.

Examples of A include $C_{2-4}$ alkylene groups, and m and n are independently an integer of 1 to 100, preferably an integer of 2 to 30, and particularly preferably an integer of 3 to 10.

Each of $R^2$ and $R^3$ is a polyolefin residue, and specific examples thereof include a residue derived from the polyolefin exemplified above. Each of $R^2$ and $R^3$ is preferably a poly(iso)butenyl group.

M is an alkali metal such as lithium, potassium, and sodium, an alkaline-earth metal such as calcium and magnesium, ammonium, or organic ammonium.

The polymer is preferably the copolymer having an (A)-(B)-(A) structure, an (A)-(B) structure, or both of these structures, composed of a block (A) derived from the polyolefin (a) having one end being acid-modified and a block (B) derived from the diol and/or the diamine (b) having a polyoxyalkylene chain being bonded together.

That is, the average number (Nn) of the repeating units of blocks (A) and blocks (B) is preferably less than 2 and is particularly preferably 1.8 or less. Nn is preferably within this range from the viewpoints of an antistatic property and HAZE. When Nn exceeds 2, the block copolymer gels, resulting in poor handling and poor compatibility.

Examples of the polymer include, in addition to the (A)-(B)-(A) block copolymer of Formula (1), a block copolymer having a structure of Formula (2).

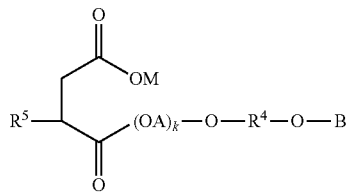

(2)

In the formula, $R^4$ is a residue that results from removing a hydroxy group from a diol compound, A is a $C_{2-4}$ alkylene group, k is an integer of 1 to 100, $R^5$ is a polyolefin residue, M is an alkali metal, an alkaline-earth metal, ammonium, or organic ammonium, and B is a hydrogen atom or a structure of Formula (3).

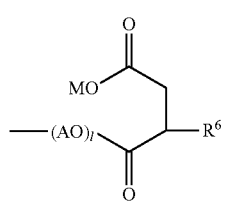

(3)

In the formula, A is a $C_{2-4}$ alkylene group, l is an integer of 1 to 100, $R^6$ is a polyolefin residue, and M is an alkali metal, an alkaline-earth metal, ammonium, or organic ammonium.

Examples of a copolymer that is obtained by using, instead of a polyether diol, a polyether diamine that is obtained by converting the hydroxy groups of a polyether diol to amino groups, as a component (b), include a compound of Formula (4).

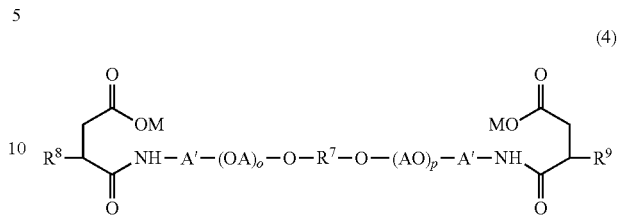

(4)

In the formula, $R^7$ is a residue that results from removing a hydroxy group from a diol moiety of a polyether diol that had not been converted to a polyether diamine, A is a $C_{2-4}$ alkylene group, A' is a $C_{2-4}$ alkylene group, o and p are independently an integer of 1 to 100, each of $R^8$ and $R^9$ is a polyolefin residue, and M is an alkali metal, an alkaline-earth metal, ammonium, or organic ammonium.

[Resin Composition]

The present invention also relates to an antistatic resin composition containing the antistatic agent and a thermoplastic resin.

Examples of the thermoplastic resin include polyolefin resins, polystyrene resins, acrylic resins, vinyl resins, polyimide resins, polyester resins, polyacetal resins, polycarbonate resins, thermoplastic polyurethane resins, fluororesins, and a mixture of two or more of these.

Examples of the polyolefin resins include homopolymers of α-olefins such as ethylene, propylene, 1-butene, 1-pentene, 1-hexene, and 4-methyl-1-pentene, copolymers of the α-olefins, copolymers of an α-olefin and a monomer that is not an α-olefin and is copolymerizable with the α-olefin, and mixtures of these. Examples of the monomer that is not an α-olefin and is copolymerizable with an α-olefin can include vinyl acetate, maleic acid, methacrylic acid, methyl methacrylate, ethyl methacrylate, and the like.

Examples of the polystyrene resins include styrene homopolymers and copolymers of a styrene and a monomer copolymerizable with a styrene. Specific examples thereof include polystyrenes, acrylonitrile-styrene resins (AS), acrylonitrile-butadiene-styrene resins (ABS), and the like.

Examples of the vinyl resins include diene polymers such as butadiene resins and polyisoprene resins, and the like. Examples of the polyamide resins include nylon and the like.

Examples of the polyester resins include aromatic polyesters such as polyethylene terephthalate, polybutylene terephthalate, and polyethylene naphthalate, aliphatic polyesters such as polybutylene adipate, polyethylene succinate, polybutylene succinate, polyethylene succinate, polybutylene succinate adipate, polyethylene succinate adipate, polycaprolactone, and polylactic acid, and the like.

Examples of the polyacetal resins include polymers of formaldehyde or trioxane. Examples of the polycarbonate resins include condensates of bisphenol A and phosgene, and condensates of bisphenol A and a carbonic diester.

Examples of the thermoplastic polyurethane resins include reaction products dm organic diisocyanate and a polymer diet Examples of the fluororesins include polymers of fluorine-containing monomers.

Among these thermoplastic resins, polyolefin resins are particularly preferable.

The formulation amount of the antistatic agent of the present invention is preferably 3 to 30% by mass and is more preferably 5 to 20% by mass relative to the amount of the thermoplastic resin.

The antistatic agent of the present invention has an adequate effect by itself. However, one of, or a combination of two or more of known anionic surfactants, known cationic surfactants, known nonionic surfactants, and known amphoteric surfactants that are not mentioned in the present invention may be concurrently used, if necessary, as long as the purpose of the present invention is not impaired. As an additional component, a polymer antistatic agent such as polyetheresteramide, an antioxidant, a lubricant, a colorant, a compatibilizer, an ionic liquid, an ultraviolet absorber, various other additives that are usually added to a resin product, and a filler can be added.

Examples of the anionic surfactants include alkylsulfuric acids and salts thereof such as sodium lauryl sulfate, potassium lauryl sulfate, sodium myristyl sulfate, potassium myristyl sulfate, sodium cetyl sulfate, sodium stearyl sulfate, sodium oleyl sulfate, and triethanolamine lauryl sulfate; alkyl ether sulfuric acids and salts thereof such as sodium polyoxyethylene lauryl ether sulfate, sodium polyoxyethylene cetyl ether sulfate, sodium polyoxyethylene oleyl ether sulfate, and triethanolamine polyoxyethylene lauryl ether sulfate; alkylaryl ether sulfuric acids and salts thereof such as sodium polyoxyethylene octylphenyl ether sulfate; alkylamide sulfuric acids and salts thereof such as sodium polyoxyethylene lauramide ether sulfate, triethanolamine polyoxyethylene lauramide ether sulfate, sodium polyoxyethylene myristamide ether sulfate, sodium polyoxyethylene oleamide ether sulfate, sodium polyoxyethylene cocamido ether sulfate, and sodium oleamide ether sulfate; acyl ester sulfuric acids and salts thereof such as glycerin hydrogenated coconut acid sulfate sodium; alkylsulfonic acids and salts thereof such as sodium lauryl sulfonate, sodium myristyl sulfonate, and sodium cocoalkyl sulfonates; alkylbenzenesulfonic acids and salts thereof such as sodium dodecylbenzenesulfonate and triethanolamine dodecylbenzenesulfonate; alkylnaphthalenesulfonic acids and salts thereof; sulfonic acid-formalin condensates and salts thereof such as naphthalenesulfonic acid salt-formalin polycondensates; sulfosuccinic acids and salts thereof such as disodium lauryl sulfosuccinate, sodium di-2-ethylhexyl sulfosuccinate, disodium polyoxyethylene lauryl sulfosuccinate, and disodium oleamide sulfosuccinate; α-olefin sulfonic acids and salts thereof such as sodium dodecene sulfonate, sodium tetradecene sulfonate, potassium dodecene sulfonate, and potassium tetradecene sulfonate; α-sulfofatty acid esters and salts thereof such as α-sulfolauric acid methyl ester, α-sulfomyristic acid methyl ester, and α-sulfolauric acid (EO)n methyl ester; N-acyl methyl-taurines and salts thereof such as potassium cocoyl acyl-N-methyl taurates, sodium lauroyl-N-methyl taurate, potassium lauroyl-N-methyl taurate, triethanolamine lauroyl-N-methyl taurate, sodium myristoyl-N-methyl taurate, triethanolamine myristoyl-N-methyl tamale, sodium cocoyl acyl-N-methyl taurates, and triethanolamine cocoyl acyl-N-methyl taurates; N-acyl glutamic acids and salts thereof such as potassium cocoyl acyl-glutamates, sodium cocoyl acyl-glutamates, triethanolamine cocoyl acyl-glutamates, sodium lauroyl-glutamate, potassium myristoyl-glutamate, sodium myristoyl-glutamate, and sodium palm acid acyl-glutamates; N-acyl glycines and salts thereof such as sodium N-lauroyl glycine, triethanolamine N-myristoyl glycine, sodium N-cocoyl acyl-glycines, and potassium N-cocoyl acyl-glycines; acyl isethionic acids and salts thereof such as sodium lauroyl isethionate, sodium myristoyl isethionate, and sodium cocoyl acyl isethionates; alkylsulfoacetic acid salts; alkyl ether phosphoric acids and salts thereof such as sodium polyoxyethylene lauryl ether phosphate, sodium polyoxyethylene cetyl ether phosphate, potassium polyoxyethylene myristyl phosphate, sodium polyoxyethylene oleyl ether phosphate, and sodium dipolyoxyethylene oleyl ether phosphate; alkyl aryl ether phosphoric acids and salts thereof; fatty acid amide ether phosphoric acids and salts thereof such as sodium polyoxyethylene lauramide ether phosphate; alkylphosphoric acids and salts thereof such as sodium lauryl phosphate, sodium myristyl phosphate, sodium cocoyl phosphate, potassium myristyl phosphate, triethanolamine lauryl phosphate, and diethanolamine oleyl phosphate; acyliminodiacetic acids and salts thereof such as sodium lauroylimino diacetate, triethanolamine lauroylimino diacetate, sodium cocoyl acylimino diacetates, disodium lauroylimino diacetate, and sodium palm kernel acid imino diacetate; ether carboxylic acids and salts thereof such as sodium polyoxyethylene lauryl ether acetate, potassium polyoxyethylene myristyl ether acetate, triethanolamine polyoxyethylene palmityl ether acetate, sodium polyoxyethylene stearyl ether acetate, and sodium polyglyceryl lauryl ether acetate; acylated peptides such as coconut acid silk peptide; amide ether carboxylic acids and salts thereof such as sodium polyoxyethylene lauramide ether carboxylate, sodium polyoxyethylene myristamide ether carboxylate, and triethanolamine polyoxyethylene cocamido ether carboxylate; acyl lactic acid salts; alkenyl succinic acids and salts thereof; and the like.

Examples of the cationic surfactants include monoalkyl quaternary ammonium salts such as lauryltrimethylammonium chloride, myristyltrimethylammonium chloride, palmityltrimethylammonium chloride, stearyltrimethylammonium chloride, oleyltrimethylammonium chloride, cetyltrimethylammonium chloride, behenyltritnethylammonium chloride, coconut alkyltrimethylammonium chlorides, beef tallow alkyltrimethylammonium chlorides, stearyltrimethylammonium bromide, coconut alkyltrimethylammonium bromides, and cetyltrimethylammonium methylsulfate; dialkyl quaternary ammonium salts such as dioctyldimethylammonium chloride, dilauryldimethylammonium chloride, and distearyldimethylammonium chloride; acylamino alkyl quaternary ammonium salts such lanolin acid aminopropylethyldimethylammonium ethylsulfate and lauroylaminoethylmethyldiethylammonium methylsulfate; alkyl ethenoxy quaternary ammonium salts such as dipalmityl polyethenoxyethylammonium chloride and distearyl polyethenoxymethylammonium chloride; alkyl isoquinolinium salts such as lauryl isoquinolinium chloride; benzalkonium salts such as lauryl dimethyl benzyl ammonium chloride and stearyl dimethyl benzyl ammonium chloride; benzethonium salts such as benzyl dimethyl{2-[2-(p-1,1,3,3-tetratnethylbutylphenoxy)ethoxy]ethyl}ammonium chloride; pyridinium salts such as cetylpyridinium chloride; imidazolinium salts; acylated basic amino acid alkyl ester salts such as ethyl N-cocoyl alginate pyrrolidone carboxylic acid salt and ethylethyl N-lauroyl lysinate hydrochloride; primary amine salts such as laurylamine hydrochloride; secondary amine salts such as dilaurylamine acetate; tertiary amine salts; fatty acid amide guanidinium salts; alkyl trialkylene glycol ammonium salts such as lauryl triethylene glycol ammonium hydroxide; and the like.

Examples of the nonionic surfactants include polyoxyethylene alkyl ethers such as POE (polyoxyethylene)octyl ether, POE (2-ethyl-hexyl)ether, POE lauryl ether, POE myristyl ether, POE cetyl ether, POE stearyl ether, POE oleyl ether, POE isostearyl ether, POE behenyl ether, and polyoxyethylene cetyl stearyl diether; polyoxyethylene polyoxypropylene glycol surfactants such as POE/POP (polyoxypropylene)butyl ether, POE/POP lauryl ether, POE/POP cetyl ether, and POE/POP glycol; polyoxyethylene aryl ethers such as POE octylphenyl ether, POE nonylphenyl ether, POE chlorophenyl ether, and POE naphthyl ether; POE hydrogenated castor oil ether and POE castor oil ether; ether surfactants such as POE lanolin alcohol ether and POE phytosterol; polyoxyethylene glycerin fatty acid esters such as POE glyceryl monostearate and POE glyceryl oleate; polyoxyethylene sorbitan fatty acid esters such as POE sorbitan monolaurate, POE sorbitan monostearate, POE sorbitan tristearate, and POE sorbitan monoisostearate; polyoxyethylene sorbitol fatty acid esters such as POE sorbitol hexastearate, POE sorbitol tetrastearate, POE sorbitol telraoleate, and POE sorbitol monolaurate; polyethylene glycol fatty acid esters such as polyethylene glycol monolaurate, polyethylene glycol monostearate, polyethylene glycol monooleate, polyethylene glycol distearate, polyethylene glycol dioleate, and polyethylene glycol diisostearate; ether ester surfactants such as polyethylene glycol lanolin fatty acid esters; glycerin fatty acid esters such as glyceryl monostearate, self-emulsifiable glyceryl monostearate, glyceryl monohydroxystearate, and glyceryl distearate; polyglycerin fatty acid esters such as diglyceryl monostearate, diglyceryl monooleate, diglyceryl dioleate, diglyceryl monoisostearate, tetraglyceryl monostearate, tetraglyceryl tristearate, tetraglyceryl pentastearate, hexaglyceryl monolaurate, hexaglyceryl monomyristate, decaglyceryl distearate, and decaglyceryl diisostearate; sorbitan fatty acid esters such as sorbitan monolaurate, sorbitan monostearate, sorbitan monooleate, sorbitan trioleate, sorbitan tristearate, and sorbitan monoisostearate; ethylene glycol fatty acid esters such as ethylene glycol monolaurate and ethylene glycol distearate; propylene glycol fatty acid esters such as propylene glycol monostearate and self-emulsifiable propylene glycol monostearate; pentaerythritol fatty acid esters such as pentaerythritol monostearate and pentaerythritol monooleate; sugar derivatives such as maltitol hydroxy fatty acid ethers, alkylated polysaccharides, alkyl(poly)glucosides, and sugar esters; alkyl glyceryl ethers such as α-monoisostearyl glyceryl ether; organic acid monoglycerides such as acetyl-monoglyceride, lactic acid monoglyceride, and citric acid monoglyceride; fatty acid alkanolamides such as coconut monoethanolamide, lauroyl monoethanolamide, myristoyl monoethanolamide, lauroyl diethanolamide, coconut diethanolamide, lauroyl isopropanolamide, myristoyl isopropanolamide, coconut isopropanolamide, POE lauroyl monoethanolamide, coconut methylmonoethanolamide, and coconut methyldiethanolamide; POE alkylamines such as POE laurylamine and POE stearylamine; amine oxides such as lauryldimethylamine oxide, cocodimethylamine oxide, and cocamide propyldimethylamine oxide; and the like.

Examples of the amphoteric surfactants include carboxybetaine surfactants such as lauryl dimethyl betaine, myristyl dimethyl betaine, palmityl dimethyl betaine, stearyl dimethyl betaine, oleyl dimethyl betaine, coconut alkyl dimethyl betaine, lauryl methyl ethyl betaine, octadecyloxy methyl dimethyl betaine, lauryl dihydroxyethyl betaine, stearyl dihydroxyethyl betaine, coconut alkyl dihydroxyethyl betaine, lauramide propyl dimethyl betaine, myristamide propyl dimethyl betaine, stearamide propyl dimethyl betaine, oleamide propyl dimethyl betaine, and cocamide propyl dimethyl betaine; glycine surfactants that are indicated as $RN^+H_2CH_2COO^-$ (R: alkyl), such as laurylglycine, stearylglycine, sodium lauryl diaminoethyl glycinate, alkyl aminoethyl glycine chlorides, and disodium cocoyl acyl-N-carboxyethyl-N-carboxyethyl ethylenediamine; aminopropionic acid surfactants that are indicated as $RN^+H_2CH_2CH_2COO^-$ (R: alkyl), such as laurel-β-alanine and stearyl-β-alanine; sulfobetaine surfactants such as sodium lauryl sulfoacetate, sodium tetradecene sulfonate, sodium sulfosuccinate di(2-ethylhexyl), lauryl dimethylhydroxypropyl sulfobetaine, myristyl dimethylhydroxypropyl sulfobetaine, lauryl dimethylpropyl sulfobetaine, coconut alkyl dimethylpropyl sulfobetaine, and lauramide propyl dimethylhydroxypropyl sulfobetaine; sulfonic acid surfactants that are indicated as $RN^+H_2CH_2CH_2SO_3^-$ (R: alkyl); sulfuric acid surfactants that are indicated as $RN^+H_2CH_2CH_2OSO_3^-$ (R: alkyl); aminocarboxylic acid salt surfactants such as sodium lauryl aminopropionate, sodium lauryl aminodipropionate, disodium N-lauroyl-N-hydroxyethyl-M-dicarboxyethyl-ethylenediamine, sodium N-lauroyl-N-hydroxyethyl-M-carboxyethyl-ethylenediamine, sodium N-lauroyl-M-carboxymethyl-N'-hydroxyethyl ethylenediamine, sodium N-cocoyl acyl-N'-carboxyethyl-N'-hydroxyethyl ethylenediamine, disodium N-lauroyl-N-hydroxyethyl-N'-dicarboxymethyl-ethylenediamine, sodium N-lauroyl-N-hydroxyethyl-N'-carboxymethyl-ethylenediamine, sodium N-hydroxydodecyl-N-polyoxyetlaylene-N'-carboxyethyl-N'-polyoxyethylene ethylenediamine, and sodium cocoyl acyl-N-hydroxyethyl ethylenediamine; imidazoline surfactants such as 2-lauryl-N-carboxymethyl-N-hydroxyethyl imidazolinium betaine, 2-myristyl-N-carboxymethyl-N-hydroxyethyl imidazolinium betaine, 2-stearyl-N-carboxymethyl-N-hydroxyethyl imidazolinium betaine, and 2-cocoalkyl-N-carboxymethyl-N-hydroxyethyl imidazolinium betaine; phosphoric acid surfactants that are indicated as $RN^+H_2CH(CH_3)P(OH)O_2^-$ (R: alkyl); lecithin; aminoacetic acid betaine surfactants such as lauryl dimethylaminoacetic acid betaine and cocamide propyl dimethylaminoacetic acid betaine; and the like.

The antistatic agent of the present invention can yield a resin composition through a masterbatch. For example, the block copolymer or a mixture of an antistatic agent containing the block copolymer and a known surfactant mentioned above can be blended with a thermoplastic resin, followed by kneading to prepare a masterbatch. A masterbatch can be prepared using a single screw extruder, a twin screw extruder, or a multi-screw extruder; however, using a twin screw extruder is desirable in terms of the cost and dispersibility. In particular, using a masterbatch can achieve homogeneous dispersion of the antistatic agent when processed into a molded article.

[Film or Sheet that Includes Resin Composition]

The antistatic resin composition that contains the antistatic agent according to the present invention is a suitable material to be used in a known, publicly-used formation method. Examples of the obtained molded article include, but are not particularly limited to, thermoformed articles such as films and sheets, monofilaments, multifilaments such as fibers and nonwoven fabrics, injection molded articles, blow molded articles, laminates, foams, and vacuum formed articles. The resin composition that contains the antistatic agent according to the present invention is excellent in formability at the time of stretch-orientated crystallization, and therefore is suitable for use in producing films and sheets, tape yarns, stretch blow molded articles, and (mono, multi)-filaments, which are obtained by stretching and remarkably exhibit the effect of the present invention.

Examples of a method of forming a molded article from the resin composition that contains the antistatic agent according to the present invention include thermoforming such as an injection molding method, a blow molding method (injection stretch blow, extrusion stretch blow, direct blow), a balloon method, blown film extrusion, a coextrusion method, a calender method, a hot pressing method, a solvent casting method, (stretching) extrusion, an extrusion lamination method using paper and/or aluminum, contour extrusion, and vacuum (pressure) forming, melt spinning (monofilament, multifilament, a spunbonding method, a melt blown method, a split yarn method, and the like), a foam molding method, a compression molding method, and the like. Any of these methods can be utilized.

In particular, a formation method that can include a stretch-orientated crystallization step such as extrusion and melt spinning is more preferably utilized because it can improve the practical strength such as the strength, the heat resistance, the impact resistance, and the transparency and the appearance of a resultant molded article. The molded article obtained from the resin composition that contains the block copolymer according to the present invention includes, for example, a molded article obtained by a known, publicly-used formation method, and the shape, size, thickness, design, and the like thereof are not limited.

The molded article, such as bottles, films and sheets, hollow tubes, laminates, vacuum (pressure)-formed containers, (mono, multi)-filaments, nonwoven fabrics, and foams, that is obtained from the resin composition that contains the block copolymer according to the present invention by a formation method described above can be suitably used as a material of a wide variety of things, for example, various packaging films for food, electronic products, medical products, pharmaceuticals, cosmetic products, and the like, including shopping bags, paper bags, shrink films, garbage bags, compost bags, lunch boxes, containers for pre-cooked food, packaging films for food and confectionery, wrap for food, wrap for a cosmetic product and a cosmetic, diapers, sanitary napkins, wrap for pharmaceuticals, pharmaceutical wrap, wrap for surgical patch applicable to shoulder stiffness, a sprain, and the like, agricultural/horticultural films, wrap for agrochemicals, films for a greenhouse use, fertilizer bags, packaging bands, packaging films for a magnetic tape cassette product such as video products, audio products, and the like, packaging films for a flexible disk, films for a printing plate use, adhesive tape, tapes, yarns, seedling pots, tarpaulins, bags for a sandbag use, films for a building use, weed control sheets, and vegetation nets, films including films for an electronic component use, electrically-insulating films, films for metal plate lamination, and films for a glass display use, base films for a prism lens sheet in a liquid crystal display component, a touch panel, and a backlight, covers for a polarizer, an optical lens, and various gauges, anti-reflective films used in a window pane of an automobile, an electric train, and the like; base films for an explosion-proof film in a display, optical sheets for a substrate in a liquid crystal display, a substrate in an organic EL display device, a substrate in a color filter, a substrate in a touch panel, a substrate in a solar cell, and the like; lens sheets used in an optical lens, a screen, and the like, materials used in electric/automobile manufacturing fields and agricultural/civil engineering/fishery fields, and the like.

EXAMPLES

The present invention will be described in more detail by examples. The scope of the present invention is, however, not limited to these examples.

<Number Average Molecular Weight>

Number average molecular weights (Mn) were measured by gel permeation chromatography according to the following measurement conditions.

Device: high temperature gel permeation chromatography (Alliance GPC 2000 by Waters Corporation)
Solvent: o-dichlorobenzene
Reference material: polystyrene Production Example 1

4,980 g of polybutenyl succinic acid (saponification value: 90 mg KOH/g), 1,200 g of polyethylene glycol (hydroxyl value: 187 mg KOH/g), and 20 g of an antioxidant (IRGANOX 1010) were charged in a stainless steel autoclave equipped with a nitrogen introduction tube, a stirrer, and a thermometer (the same applies hereinafter). Replacement with nitrogen was adequately performed, and the temperature was then raised to 80° C., followed by adding 234 g of 48% KOH thereto. Replacement with nitrogen was adequately performed again, and the temperature was then raised to 220° C. The resultant was maintained for 3 hours under a condition at 220° C., at 0.2 kPa or less, while bubbling with a trace amount of nitrogen, and under reduced pressure. The resultant product was a viscous polymer. The ester value of the product was 36 mg KOH/g. An IR spectrum showed characteristic absorbances of C=O stretching at 1735 $cm^{-1}$ and of C(=O)O— antisymmetric stretching at 1565 $cm^{-1}$. The resultant product is called a block copolymer 1.

Production Example 2

4,980 g of polybutenyl succinic acid (saponification value: 90 mg KOH/g), 2,000 g of polyethylene glycol (hydroxyl value: 112 mg KOH/g), and 22 g of an antioxidant (IRGANOX 1010) were charged in a stainless steel autoclave. Replacement with nitrogen was adequately performed, and the temperature was then raised to 80° C., followed by adding 234 g of 48% KOH thereto. Replacement with nitrogen was adequately performed again, and the temperature was then raised to 220° C. The resultant was maintained for 3 hours under a condition at 220° C., at 0.2 kPa or less, while bubbling with a trace amount of nitrogen, and under reduced pressure. The resultant product was a viscous polymer. The ester value of the product was 32 mg KOH/g. An IR spectrum showed characteristic absorbances of C=O stretching at 1735 $cm^{-1}$ and of C(=O)O— antisymmetric stretching at 1565 $cm^{-1}$. The resultant product is called a block copolymer 2.

Production Example 3

4,980 g of polybutenyl succinic acid (saponification value: 90 mg KOH/g), 3,000 g of polyethylene glycol (hydroxyl value: 75 mg KOH/g), and 21 g of an antioxidant (IRGANOX 1010) were charged in a stainless steel autoclave. Replacement with nitrogen was adequately performed, and the temperature was then raised to 80° C., followed by adding 234 g of 48% KOH thereto. Replacement with nitrogen was adequately performed again, and the temperature was then raised to 220° C. The resultant was maintained for 3 hours under a condition at 220° C., at 0.2 kPa or less, while babbling with a trace amount of nitrogen, and under reduced pressure. The resultant product was a viscous polymer. The ester value of the product was 28 mg KOH/g. An IR spectrum showed characteristic absorbances of C=O stretching at 1735 $cm^{-1}$ and of antisymmetric stretching at 1565 $cm^{-1}$. The resultant product is called a block copolymer 3.

Production Example 4

4,980 g of polybutenyl succinic acid (saponification value: 90 mg KOH/g), 2,026 g of Bisol 18EN (an adduct of bisphenol A with 18 moles of EO, hydroxyl value: 111 mg KOH/g) manufactured by TOHO Chemical Industry CO., LTD., and 18 g of an antioxidant (IRGANOX 1010) were charged in a stainless steel autoclave. Replacement with nitrogen was adequately performed, and the temperature was then raised to 80° C., followed by adding 234 g of 48% KOH thereto. Replacement with nitrogen was adequately performed again, and the temperature was then raised to 220° C. The resultant was maintained for 4 hours under a condition at 220° C., at 0.2 kPa or less, while bubbling with a trace amount of nitrogen, and under reduced pressure. The resultant product was a viscous polymer. The ester value of the product was 32 mg KOH/g. An IR spectrum showed characteristic absorbances of C=O stretching at 1734 $cm^{-1}$ and of C(=O)O— antisymmetric stretching at 1564 $cm^{-1}$. The resultant product is called a block copolymer 4.

Production Example 5

3,600 g of polybutenyl succinic acid (saponification value: 62 mg KOH/g), 600 g of polyethylene glycol (hydroxyl value: 187 mg KOH/g), and 22 g of an antioxidant (IRGANOX 1010) were charged in a stainless steel autoclave. Replacement with nitrogen was adequately performed, and the temperature was then raised to 80° C., followed by adding 234 g of 48% KOH thereto. Replacement with nitrogen was adequately performed again, and the temperature was then raised to 220° C. The resultant was maintained for 3 hours under a condition at 220° C., at 0.2 kPa or less, while bubbling with a trace amount of nitrogen, and under reduced pressure. The resultant product was a viscous polymer. The ester value of the product was 26 mg KOH/g. An IR spectrum showed characteristic absorbances of C=O stretching at 1736 $cm^{-1}$ and of antisymmetric stretching at 1564 $cm^{-1}$. The resultant product is called a block copolymer 5.

Production Example 6

4,980 g of polybutenyl succinic acid (saponification value: 90 mg KOH/g), 2,026 g of Bisol 18EN (an adduct of bisphenol A with 18 moles of EO, hydroxyl value: 111 mg KOH/g) manufactured by TOHO Chemical Industry CO., LTD., and 22 g of an antioxidant (IRGANOX 1010) were charged in a stainless steel autoclave. Replacement with nitrogen was adequately performed, and the temperature was then raised to 80° C., followed by adding 176 g of 48% KOH thereto. Replacement with nitrogen was adequately performed again, and the temperature was then raised to 220° C. The resultant was maintained for 3 hours under a condition at 220° C., at 0.2 kPa or less, while bubbling with a trace amount of nitrogen, and under reduced pressure. The resultant product was a viscous polymer. The ester value of the product was 24 mg KOH/g. An IR spectrum showed characteristic absorbances of C=O stretching at 1734 $cm^{-1}$ and of antisymmetric stretching at 1564 $cm^{-1}$. The resultant product is called a block copolymer 6.

Production Example 7

3,600 g of polybutenyl succinic acid (saponification value: 62 mg KOH/g), 1,000 g of polyethylene glycol (hydroxyl value: 112 mg KOH/g), and 24 g of an antioxidant (IRGANOX 1010) were charged in a stainless steel autoclave. Replacement with nitrogen was adequately performed, and the temperature was then raised to 80° C., followed by adding 210 g of 30% lithium hydroxide monohydrate thereto. Replacement with nitrogen was adequately performed again, and the temperature was then raised to 220° C. The resultant was maintained for 3 hours under a condition at 220° C., at 0.2 kPa or less, while bubbling with a trace amount of nitrogen, and under reduced pressure. The resultant product was a viscous polymer. The ester value of the product was 24 mg KOH/g. An IR spectrum showed characteristic absorbances of C=O stretching at 1736 $cm^{-1}$ and of C(=O)O— antisymmetric stretching at 1590 $cm^{-1}$. The resultant product is called a block copolymer 7.

Production Example 8

3,600 g of polybutenyl succinic acid (saponification value: 62 mg KOH/g), 1,000 g of polyethylene glycol (hydroxyl value: 112 mg KOH/g), and 24 g of an antioxidant (IRGANOX 1010) were charged in a stainless steel autoclave. Replacement with nitrogen was adequately performed, and the temperature was then raised to 80° C., followed by adding 280 g of 30% lithium hydroxide monohydrate thereto. Replacement with nitrogen was adequately performed again, and the temperature was then raised to 220° C. The resultant was maintained for 3 hours under a condition at 220° C., at 0.2 kPa or less, while bubbling with a trace amount of nitrogen, and under reduced pressure. The resultant product was a viscous polymer. The ester value of the product was 24 mg KOH/g. An IR spectrum showed characteristic absorbances of C=O stretching at 1736 $cm^{-1}$ and of C(=O)O— antisymmetric stretching at 1590 $cm^{-1}$. The resultant product is called a block copolymer 8.

Production Example 9

4,980 g of polybutenyl succinic acid (saponification value: 90 mg KOH/g), 6,000 g of polyethylene glycol (hydroxyl value: 37 mg KOH/g), and 56 g of an antioxidant (IRGANOX 1010) were charged in a stainless steel autoclave. Replacement with nitrogen was adequately performed, and the temperature was then raised to 80° C., followed by adding 287 g of stearyldimethylamine thereto. Replacement with nitrogen was adequately performed again, and the temperature was then raised to 220° C. The resultant was maintained for 3 hours under a condition at 220° C., at 0.2 kPa or less, while bubbling with a trace amount of nitrogen, and under reduced pressure. The resultant product was a viscous polymer. The ester value of the product was 20 mg KOH/g. An IR spectrum showed characteristic absorbances of C=O stretching at 1733 $cm^{-1}$ and of ammonium antisymmetric stretching at 2710 $cm^{-1}$. The resultant product is called a block copolymer 9.

Production Example 10

4,980 g of polybutenyl succinic acid (saponification value: 90 mg KOH/g), 400 g of polyethylene glycol (hydroxyl value: 561 mg KOH/g), and 18 g of an antioxidant (IRGANOX 1010) were charged in a stainless steel autoclave. Replacement with nitrogen was adequately performed, and the temperature was then raised to 80° C., followed by adding 234 g of 48% KOH thereto. Replacement with nitrogen was adequately performed again, and the temperature was then raised to 220° C. The resultant was maintained for 3 hours under a condition at 220° C., at 0.2 kPa or less, while bubbling with a trace amount of nitrogen, and under reduced pressure. The resultant product was a viscous polymer. The ester value of the product was 40 mg KOH/g. An IR spectrum showed characteristic absorbances of C=O stretching at 1732 $cm^{-1}$ and of C(=O)O— antisymmetric stretching at 1565 $cm^{-1}$. The resultant product is called a block copolymer 10.

Production Example 11

3,715 g of polybutenyl succinic acid (saponification value: 62 mg KOH/g), 277 g of polyethylene glycol (hydroxyl value: 280.5 mg KOH/g), 345 g of Bisol 18EN (an adduct of bisphenol A with 18 moles of EO, hydroxyl value: 111 mg KOH/g) manufactured by TOHO Chemical Industry CO., LTD., and 23 g of an antioxidant (IRGANOX 1010) were charged in a stainless steel autoclave. Replacement with nitrogen was adequately performed, and the temperature was then raised to 80° C., followed by adding 242 g of 48% KOH thereto. Replacement with nitrogen was adequately performed again, and the temperature was then raised to 220° C. The resultant was maintained for 5 hours under a condition at 220° C., at 0.2 kPa or less, while bubbling with a trace amount of nitrogen, and under reduced pressure. The resultant product was a viscous polymer. The ester value of the product was 26 mg KOH/g. An IR spectrum showed characteristic absorbances of C=O stretching at 1732 cm$^{-1}$ and of C(=O)O— antisymmetric stretching at 1565 cm$^{-1}$. The resultant product is called a block copolymer 11.

Production Example 12

3,411 g of polybutenyl succinic acid (saponification value: 90 mg KOH/g), 743 g of an adduct of N-methyldiethanolamine with 8.4 moles of EO (amine value: 106 mg KOH/g), and 23 g of an antioxidant (IRGANOX 1010) were charged in a stainless steel autoclave. Replacement with nitrogen was adequately performed, and the temperature was then raised to 80° C., followed by adding 329 g of 48% KOH thereto. Replacement with nitrogen was adequately performed again, and the temperature was then raised to 220° C. The resultant was maintained for 6 hours under a condition at 220° C., at 0.2 kPa or less, while bubbling with a trace amount of nitrogen, and under reduced pressure. The resultant product was a viscous polymer. The ester value of the product was 40 mg KOH/g. An IR spectrum showed characteristic absorbances of C=O stretching at 1733 cm$^{-1}$ and of C(=O)O— antisymmetric stretching at 1565 cm$^{-1}$. The resultant product is called a block copolymer 12.

Production Example 13

2,496 g of polybutenyl succinic acid (saponification value: 62 mg KOH/g), 1,388 g of polyethylene oxide both ends of which are aminated (amine value: 56.1 mg KOH/g), and 20 g of an antioxidant (IRGANOX 1010) were charged in a stainless steel autoclave. Replacement with nitrogen was adequately performed, and the temperature was then raised to 80° C., followed by adding 96 g of potassium methoxide thereto. Replacement with nitrogen was adequately performed again, and a reaction for methanol removal was then performed for 4 hours under a condition at the same temperature, at 0.2 kPa or less, while bubbling with a trace amount of nitrogen, and under reduced pressure. The resultant product was a viscous polymer. An IR spectrum showed absorbances of C(=O)O-M antisymmetric stretching at 1565 cm$^{-1}$ and of C(=O)—N stretching vibration at 1641 cm$^{-1}$, and a minimal absorbance of C(=O)—N—C(=O) stretching at 1709 and 1770 cm$^{-1}$. The resultant product is called a block copolymer 13.

Production Example 14

9,700 parts of a polypropylene of a low molecular weight having an Mn of 3,300 and an average number of terminal double bonds of 0.9 and 300 parts of maleic anhydride were fused in a nitrogen gas atmosphere at 220° C., and the reaction was performed for 10 hours. Subsequently, excess maleic acid was distilled off at 200° C. over 4 hours under reduced pressure to obtain a maleic anhydride modified-polypropylene. The Mn was 3,400, the saponification value was 30 mg KOH/g, and the degree of acid-modification per molecule was 0.9.

Production Example 15

9,900 parts of a polypropylene of a low molecular weight having an Mn of 8,800 and an average number of terminal double bonds of 0.9 and 100 parts of maleic anhydride were fused in a nitrogen gas atmosphere at 220° C., and the reaction was performed for 14 hours. Subsequently, excess maleic acid was distilled off at 200° C. over 4 hours under reduced pressure to obtain a maleic anhydride modified-polypropylene. The Mn was 8,900, the saponification value was 14 mg KOH/g, and the degree of acid-modification per molecule was 0.9.

Production Example 16

9,500 parts of a polypropylene of a low molecular weight having an Mn of 2,800 and an average number of terminal double bonds of 1.3 and 500 parts of maleic anhydride were fused in a nitrogen gas atmosphere at 220° C., and the reaction was performed for 20 hours. Subsequently, excess maleic acid was distilled off at 200° C. over 4 hours under reduced pressure to obtain a maleic anhydride modified-polypropylene. The Mn was 2,900, the saponification value was 39 mg KOH/g, and the degree of acid-modification per molecule was 1.3.

Production Example 17

9,800 parts of a polypropylene of a low molecular weight having an Mn of 8,900 and an average number of terminal double bonds of 1.6 and 200 parts of maleic anhydride were fused in a nitrogen gas atmosphere at 220° C., and the reaction was performed for 20 hours. Subsequently, excess maleic acid was distilled off at 200° C. over 4 hours under reduced pressure to obtain a maleic anhydride modified-polypropylene. The Mn was 9,000, the saponification value was 20 mg KOH/g, and the degree of acid-modification per molecule was 1.6.

Production Example 18

4,000 g of the maleic anhydride modified-polypropylene prepared in Production Example 14, 530 g of polyethylene glycol (hydroxyl value: 112 mg KOH/g), 24 g of an antioxidant (IRGANOX 1010), 88 g of 48% NaOH, and 176 g of ionized water were charged in a stainless steel autoclave. Replacement with nitrogen was adequately performed, and the temperature was then raised to 220° C., followed by stirring for 1 hour. The resultant was maintained for 4 hours under a condition at 0.2 kPa or less, while bubbling with a trace amount of nitrogen, and under reduced pressure. The resultant product was easy to handle and was a solid polymer. The ester value of the product was 13 mg KOH/g, and the average number (Nn) of repetition was less than 2. An IR spectrum showed characteristic absorbances of C=O stretching at 1737 cm$^{-1}$ and of C(=O)O— antisymmetric stretching at 1579 cm$^{-1}$. The resultant product is called a block copolymer 14.

Production Example 19

4000 g of the maleic anhydride modified-polypropylene prepared in Production Example 14, 825 g of polyethylene glycol (hydroxyl value: 73 mg KOH/g), 24 g of an antioxidant (IRGANOX 1010), 44 g of sodium acetate, 24 g of zirconyl acetate, and 132 g of ionized water were charged in a stainless steel autoclave. Replacement with nitrogen was adequately performed, and the temperature was then raised to 220° C., followed by stirring for 1 hour. The resultant was maintained for 4 hours under a condition at 0.2 kPa or less, while bubbling with a trace amount of nitrogen, and under reduced pressure. The resultant product was easy to handle and was a solid polymer. The ester value of the product was 13 mg KOH/g, and the average number (Nn) of repetition was less than 2. An IR spectrum showed characteristic absorbances of C=O stretching at 1738 cm$^{-1}$ and of C(=O)O— antisymmetric stretching at 1566 cm$^{-1}$. The resultant product is called a block copolymer 15.

Production Example 20

4,000 g of the maleic anhydride modified-polypropylene prepared in Production Example 15, 61 g of polyethylene glycol (hydroxyl value: 374 mg KOH/g), 20 g of an antioxidant (IRGANOX 1010), 32 g of sodium acetate, 20 g of zirconyl acetate, and 96 g of ionized water were charged in a stainless steel autoclave. Replacement with nitrogen was adequately performed, and the temperature was then raised to 220° C., followed by stirring for 1 hour. The resultant was maintained for 4 hours under a condition at 0.2 kPa or less, while bubbling with a trace amount of nitrogen, and under reduced pressure. The resultant product was easy to handle and was a solid polymer. The ester value of the product was 6 mg KOH/g, and the average number (Nn) of repetition was less than 2. An IR spectrum showed characteristic absorbances of C=O stretching at 1738 cm$^{-1}$ and of C(=O)O— antisymmetric stretching at 1566 cm$^{-1}$. The resultant product is called a block copolymer 16.

Production Example 21

4,000 g of the maleic anhydride modified-polypropylene prepared in Production Example 14, 2,144 g of polyethylene glycol (hydroxyl value: 28 mg KOH/g), 24 g of an antioxidant (IRGANOX 1010), 29 g of lithium hydroxide, and 24 g of zirconyl acetate were charged in a stainless steel autoclave. Replacement with nitrogen was adequately performed, and the temperature was then raised to 220° C., followed by stirring for 1 hour. The resultant was maintained for 4 hours under a condition at 0.2 kPa or less, while bubbling with a trace amount of nitrogen, and under reduced pressure. The resultant product was easy to handle and was a solid polymer. The ester value of the product was 10 mg KOH/g, and the average number (Nn) of repetition was less than 2. An spectrum showed a characteristic absorbance of C=O stretching at 1737 cm$^{-1}$. The resultant product is called a block copolymer 17.

Production Example 22

4,000 g of the maleic anhydride modified-polypropylene prepared in Production Example 16, 414 g of polyethylene glycol (hydroxyl value: 374 mg KOH/g), 22 g of an antioxidant (IRGANOX 1010), and 22 g of zirconyl acetate were charged in a stainless steel autoclave. Replacement with nitrogen was adequately performed, and the temperature was then raised to 220° C. The resultant was maintained for 4 hours under a condition at 0.2 kPa or less, while bubbling with a trace amount of nitrogen, and under reduced pressure. The temperature was then lowered to 80° C., followed by charging 74 g of potassium hydroxide and 264 g of ionized water therein. Dehydration was performed for 2 hours under a condition at 0.2 kPa or less, while bubbling with a trace amount of nitrogen, and under reduced pressure. The resultant product was easy to handle and was a solid polymer. The ester value of the product was 17 mg KOH/g, and the average number (Nn) of repetition was less than 2. An IR spectrum showed characteristic absorbances of C=O stretching at 1742 cm$^{-1}$ and of C(=O)O— antisymmetric stretching at 1572 cm$^{-1}$. The resultant product is called a block copolymer 18.

Production Example 23

4,000 g of the maleic anhydride modified-polypropylene prepared in Production Example 14, 1058 g of polyethylene glycol (hydroxyl value; 112 mg KOH/g), 25 g of an antioxidant (IRGANOX 1010), 98 g of 48% NaOH, and 196 g of ionized water were charged in a stainless steel autoclave. Replacement with nitrogen was adequately performed, and the temperature was then raised to 220° C., followed by stirring for 1 hour. The resultant was maintained for 4 hours under a condition at 0.2 kPa or less, while bubbling with a trace amount of nitrogen, and under reduced pressure. The resultant product was easy to handle and was a solid polymer. The ester value of the product was 13 mg KOH/g, and the average number (Nn) of repetition was less than 2. An IR spectrum showed characteristic absorbances of C=O stretching at 1737 cm$^{-1}$ and of C(=O)O— antisymmetric stretching at 1579 cm$^{-1}$. The resultant product is called a block copolymer 19.

Comparative Production Example 1

1,245 g of polybutenyl succinic acid (saponification value; 90 mg KOH/g), 750 g of polyethylene glycol (hydroxyl value: 75 mg KOH/g), 10 g of an antioxidant (IRGANOX 1010), and 6 g of p-toluenesulfonic acid were charged in a stainless steel autoclave. Replacement with nitrogen was adequately performed, and the temperature was then raised to 230° C., followed by maintaining the resultant for 4 hours. The resultant product was a viscous polymer. The acid value of the product was 33 mg KOH/g. An IR spectrum showed an absorbance of C=O stretching at 1733 cm$^{-1}$ and no absorbance of characteristic antisymmetric stretching of a carboxylic acid anion in the vicinity of 1570 cm$^{-1}$. The resultant product is called a block copolymer 20.

Comparative Production Example 2

4,980 g of polybutenyl succinic acid (saponification value: 90 mg KOH/g), 2000 g of polyethylene glycol (hydroxyl value: 112 mg KOH/g), and 36 g of an antioxidant (IRGANOX 1010) were charged in a stainless steel autoclave. Replacement with nitrogen was adequately performed, and the temperature was then raised to 230° C., followed by maintaining the resultant for 5 hours. The resultant product was a viscous polymer. The acid value of the product was 35 mg KOH/g. An IR spectrum showed an absorbance of C=O stretching at 1733 cm$^{-1}$ and no absorbance of characteristic antisymmetric stretching of a carboxylic acid anion in the vicinity of 1570 cm$^{-1}$. The resultant product is called a block copolymer 21.

Comparative Production Example 3

616 g of polybutenyl succinic acid (saponification value: 91 mg KOH/g) and 162 g of 12-aminododecanoic acid were charged in a stainless steel autoclave. Replacement with nitrogen was adequately performed, and the resultant was maintained for 6 hours under a condition at 220° C., at 0.2 kPa or less, while blowing a trace amount of nitrogen thereinto, and under reduced pressure to obtain a viscous polymer as a product. Then, 57.5 g of the product, 33.5 g of polyethylene glycol (hydroxyl value: 74.8 mg KOH/g), 7.8 g of sodium dodecylbenzenesulfonate, 0.3 g of an antioxidant (BHT), and 1.0 g of p-toluenesulfonic acid were charged. Replacement with nitrogen was adequately performed, and the resultant was maintained for 5 hours under a condition at 230° C., at 0.2 kPa or less, while blowing a trace amount of nitrogen thereinto, and under reduced pressure. The resultant product was a viscous polymer. The acid value of the product was 0.05 mg KOH/g. An IR spectrum showed characteristic absorbances of C=O stretching at 1734 cm$^{-1}$ and 1639 cm$^{-1}$ and of C(=O)—N—C(=O) stretching at 1705 cm$^{-1}$. The resultant product is called a block copolymer 22.

Comparative Production Example 41

4,000 g of the maleic anhydride modified-polypropylene prepared in Production Example 17, 292 g of polyethylene glycol (hydroxyl value: 112 mg KOH/g), 25 g of an antioxidant (IRGANOX 1010), 33 g of potassium hydroxide, and 100 g of ionized water were charged in a stainless steel autoclave. Replacement with nitrogen was adequately performed, and the temperature was then raised to 220° C., followed by stirring for 1 hour. The resultant was maintained for 4 hours under a condition at 0.2 kPa or less, while bubbling with a trace amount of nitrogen, and under reduced pressure. The resultant product was difficult to handle and was a rubbery solid polymer. The ester value of the product was 7 mg KOH/g, and the average number (Nn) of repetition was 3.1. An IR spectrum showed characteristic absorbances of C=O stretching at 1737 cm$^{-1}$ and of antisymmetric stretching at 1579 cm$^{-1}$. The resultant product is called a block copolymer 23.

Antistatic agents of Examples and Comparative Examples that include the block copolymers prepared in Production Examples and Comparative Production Examples were prepared as shown in the column "Antistatic agent" in Table 1. The antistatic agents were mixed with a thermoplastic resin according to the formulation shown in Table 1, thereby preparing resin compositions of Example 1 to Example 34 and Comparative Example 1 to Comparative Example 4, from each of which a specimen was obtained.

Specifically, the specimen was prepared by forming the antistatic agent (block copolymer) shown in Table 1 into a film- or a sheet-like specimen according to the procedure in <Specimen preparation> below, and the antistatic property, the appearance, and the transparency of the specimen were evaluated according to <Evaluation method> below.

In Table 1, DBSNa is sodium dodecylbenzenesulfonate and AcNa is sodium acetate. Example 14 is a mixture of the block copolymer 3 and DBSNa at a mass ratio of 19:1, Example 15 is a mixture of the block copolymer 3 and AcNa at a mass ratio of 19:1, and Example 30 is a mixture of the block copolymer 11 and DBSNa at a mass ratio of 19:1.

The column "Formulation amount" in Table 1 indicates the proportion (% by mass) of an antistatic agent in the above-mentioned resin compositions, and the column "Specimen" indicates the species of the specimen 1 to the specimen 5 shown in <Specimen preparation> below.

<Specimen Preparation>

Specimens were prepared according to the following procedure. In appearance evaluation and transparency evaluation below, a specimen in which no antistatic agent was mixed was prepared in the same procedure to be used as a reference specimen.

(1) Specimen 1

The aforementioned antistatic agent of the present invention was mixed with a thermoplastic resin that was a polypropylene [NOVATEC-PP FL6H (trade name: sold by Japan Polypropylene Corporation)] according to the formulation amount shown in Table 1, and the resultant was then mixed and dissolved at 200° C. using a Labo-plastomill and a mixing roll machine (manufactured by Toyo Seiki Seisaku-sho, Ltd.). The mixed resin was formed into a sheet of 0.5 mm thick, 60 mm long, and 60 mm wide with a press machine. Subsequently, the sheet was heated in an oven, and was then stretched to 5.0 times in length and 5.0 times in width to obtain a film of 20 µm thick.

(2) Specimen 2

The aforementioned antistatic agent of the present invention was mixed with a thermoplastic resin that was a polypropylene [Prime Polypro F-300SP (trade name: sold by Prime Polymer Go, Ltd.)] according to the formulation amount shown in Table 1, and a sheet of 200 µm thick was formed with a T-die extruder at a fuse temperature of 200 to 240° C.

(3) Specimen 3

The aforementioned antistatic agent of the present invention was mixed with a thermoplastic resin that was a polyethylene [Sumikathene F-102 (trade name: sold by Sumitomo Chemical Company, Limited)] according to the formulation amount shown in Table 1, and a sheet of 200 µm thick was formed with a T-die extruder at a fuse temperature of 200 to 220° C.

(4) Specimen 4

The aforementioned antistatic agent of the present invention was mixed with a thermoplastic resin that was polylactic acid [LACEA H-400 (trade name: sold by Mitsui Chemicals, Inc)] according to the formulation amount shown in Table 1, and the resultant was then mixed and dissolved at 200° C. using a Labo-plastomill and a mixing roll machine (manufactured by Toyo Seiki Seisaku-sho, Ltd.). The mixed resin was formed into a sheet of 0.2 mm thick, 60 mm long, and 60 mm wide with a press machine. Subsequently, the sheet was heated in an oven, and was then stretched to 3.0 times in length and 3.0 times in width to obtain a film of 20 µm thick.

(5) Specimen 5

The aforementioned antistatic agent of the present invention was mixed with a thermoplastic resin that was a polypropylene [NOVATEC-PP FL6H (trade name; sold by Japan Polypropylene Corporation)] according to the formulation amount shown in Table 1, and a masterbatch was formed therefrom with a twin screw extruder. The resin composition was extruded with a T-die to obtain an oriented film of 30 µm thick by a tenter method with a biaxial stretching machine.

<Evaluation Method>

(1) Antistatic Property

A specimen prepared was left for 1 day under an environment at a temperature of 23° C. and at relative humidity of 50%, and the specific surface resistance value of the specimen was measured under the same condition according to JIS-K6911 using a super insulation-resistance tester P-616 manufactured by Kawaguchi Electric Works Co., Ltd. Subsequently, the specimen was immersed in water at 80° C. for 30 minutes, and was wiped eon the surface with a clean cloth, followed by measuring the specific surface resistance value thereof in the same manner as above. The smaller the numerical value thereof is, the greater the antistatic property is, A desirable specific surface resistance value (Log Ω/□) is 13 or less.

which an antistatic agent of the present invention was mixed was evaluated. The smaller the ΔHAZE is, the closer the transparency is to that of the specimen in which no antistatic agent was mixed. A desirable ΔHAZE is 10 or less.

The results obtained are shown in Table 1.

TABLE 1

| Examples | | Antistatic agent * | Formulation amount (% by mass) | Specimen | Specific surface resistance value Log Ω/□ Before washing | After washing | Appearance | ΔHAZE (%) |
|---|---|---|---|---|---|---|---|---|
| Examples | 1 | Block copolymer 1 | 10 | 1 | 11.0 | 11.0 | ○ | 3 |
| | 2 | Block copolymer 2 | 10 | 1 | 11.8 | 11.8 | ○ | 4 |
| | 3 | Block copolymer 3 | 10 | 1 | 12.2 | 12.4 | ○ | 4 |
| | 4 | Block copolymer 4 | 10 | 1 | 10.7 | 10.8 | ○ | 3 |
| | 5 | Block copolymer 5 | 10 | 1 | 10.3 | 10.4 | ○ | 2 |
| | 6 | Block copolymer 6 | 10 | 1 | 11.5 | 11.4 | ○ | 2 |
| | 7 | Block copolymer 7 | 10 | 1 | 11.8 | 11.9 | ○ | 4 |
| | 8 | Block copolymer 8 | 10 | 1 | 11.2 | 11.0 | ○ | 4 |
| | 9 | Block copolymer 9 | 10 | 1 | 12.4 | 12.4 | ○ | 3 |
| | 10 | Block copolymer 10 | 10 | 1 | 11.3 | 11.2 | ○ | 2 |
| | 11 | Block copolymer 11 | 10 | 1 | 11.9 | 12.0 | ○ | 5 |
| | 12 | Block copolymer 12 | 10 | 1 | 11.1 | 11.3 | ○ | 4 |
| | 13 | Block copolymer 13 | 10 | 1 | 11.9 | 12.3 | ○ | 5 |
| | 14 | Block copolymer 3/ DBSNa (19/1) | 10 | 1 | 10.9 | 11.1 | ○ | 4 |
| | 15 | Block copolymer 3/ AcNa (19/1) | 10 | 1 | 11.3 | 11.4 | ○ | 4 |
| | 16 | Block copolymer 1 | 5 | 1 | 12.7 | 12.8 | ○ | 1 |
| | 17 | Block copolymer 1 | 20 | 1 | 10.5 | 10.8 | ○ | 7 |
| | 18 | Block copolymer 1 | 10 | 2 | 11.8 | 12.0 | ○ | 5 |
| | 19 | Block copolymer 1 | 10 | 3 | 12.4 | 12.5 | ○ | 6 |
| | 20 | Block copolymer 1 | 10 | 4 | 12.3 | 12.6 | ○ | 8 |
| | 21 | Block copolymer 1 | 10 | 5 | 12.2 | 12.3 | ○ | 3 |
| | 22 | Block copolymer 14 | 10 | 1 | 11.5 | 11.6 | ○ | 3 |
| | 23 | Block copolymer 15 | 10 | 1 | 12.1 | 12.1 | ○ | 4 |
| | 24 | Block copolymer 16 | 10 | 1 | 12.3 | 12.3 | ○ | 2 |
| | 25 | Block copolymer 17 | 10 | 1 | 10.8 | 10.9 | ○ | 4 |
| | 26 | Block copolymer 18 | 10 | 1 | 12.4 | 12.5 | ○ | 5 |
| | 27 | Block copolymer 19 | 10 | 1 | 12.4 | 12.4 | ○ | 4 |
| | 28 | Block copolymer 14 | 5 | 1 | 12.6 | 12.7 | ○ | 1 |
| | 29 | Block copolymer 14 | 20 | 1 | 10.7 | 10.7 | ○ | 8 |
| | 30 | Block copolymer 11/ DBSNa (19/1) | 10 | 1 | 11.0 | 11.1 | ○ | 3 |
| | 31 | Block copolymer 14 | 10 | 2 | 11.9 | 11.9 | ○ | 6 |
| | 32 | Block copolymer 14 | 10 | 3 | 12.3 | 12.4 | ○ | 7 |
| | 33 | Block copolymer 14 | 10 | 4 | 12.1 | 12.2 | ○ | 7 |
| | 34 | Block copolymer 14 | 10 | 5 | 11.7 | 11.8 | ○ | 2 |
| Comparative Examples | 1 | Block copolymer 20 | 10 | 1 | 14.8 | 14.8 | x | 15 |
| | 2 | Block copolymer 21 | 10 | 1 | 15.0 | 15.1 | ○ | 12 |
| | 3 | Block copolymer 22 | 10 | 1 | 12.5 | 15.2 | ○ | 17 |
| | 4 | Block copolymer 23 | 10 | 1 | 13.9 | 13.9 | ○ | 12 |

* The numbers in parentheses in the case of mixing two species indicate a mass ratio in formulation amount.

The results obtained are shown in Table 1.

(2) Appearance

A specimen in which no antistatic agent was mixed and a specimen in which an antistatic agent of the present invention was mixed were compared by visual observation. A specimen that had appearance similar to the specimen in which no antistatic agent was mixed and that looked uniform because the antistatic agent was compatible with the resin was evaluated as ○, and a specimen that had poor appearance with a streak, a void, fish eye, and/or the like was evaluated as x.

The results obtained are shown in Table 1.

(3) Transparency

The haze value of a specimen (film, sheet) prepared was measured by a haze meter (HAZEMETER TC-HIIIDPK manufactured by Tokyo Denshoku Co., Ltd.), and the difference ΔHAZE between the haze values of the specimen in which no antistatic agent was mixed and of the specimen in As shown in Table 1, each of Example 1 to Example 34 resulted in that there was almost no change in antistatic performance before and after washing, the appearance was excellent with no streak, no void, no fish eye, or the like as in the case of a specimen to which no antistatics was added, and the transparency was also excellent.

On the other hand, in Comparative Example 1 to Comparative Example 4, all of preserved antistatic property, appearance, and transparency were not necessarily fulfilled.

Based on these results, it was confirmed that the antistatic agent according to the present invention has excellent antistatic property, the antistatic property is well preserved, and the appearance and the transparency thereof are not impaired when kneaded with a resin.

The invention claimed is:
1. An antistatic agent comprising a block copolymer which is obtained from a reaction product of a polyolefin (a) having one end being acid-modified and a diol and/or a diamine (b) having a polyoxyalkylene chain, and in which a part or all of acid groups remaining in the reaction product is neutralized with an alkaline substance, wherein the polyolefin (a) having one end being acid-modified is poly(iso)butenyl succinic anhydride.

2. The antistatic agent according to claim 1, wherein the diol and/or the diamine (b) having a polyoxyalkylene chain is a polyether diol obtained by adding an alkylene oxide to a diol compound.

3. The antistatic agent according to claim 1, wherein the block copolymer is a copolymer having an (A)-(B)-(A) structure, an (A)-(B) structure, or both of these structures, composed of a block (A) derived from the polyolefin (a) having one end being acid-modified and a block (B) derived from the diol and/or the diamine (b) having a polyoxyalkylene chain being bonded together.

4. An antistatic agent comprising a block copolymer of Formula (1):

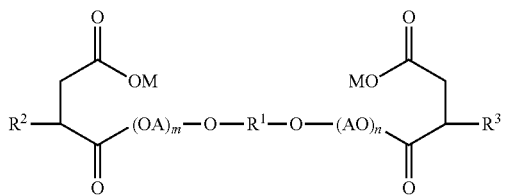

(1)

(where $R^1$ is a residue that results from removing a hydroxy group from a diol compound, A is a $C_{2-4}$ alkylene group, m and n are independently an integer of 1 to 100, each of $R^2$ and $R^3$ is a polyolefin residue, and M is an alkali metal, an alkaline-earth metal, ammonium, or organic ammonium.

5. An antistatic agent comprising a block copolymer which is obtained from a reaction product of a polyolefin (a) having one end being acid-modified and a diol and/or a diamine (b) having a polyoxyalkylene chain, and in which a part or all of acid groups remaining in the reaction product is neutralized with an alkaline substance, wherein
the polyolefin (a) having one end being acid-modified is a polyolefin that is a maleic anhydride-modified polypropylene, and
the polypropylene has an average number of terminal double bonds per molecule of 1.0 or less.

6. The antistatic agent according to claim 5, wherein the diol and/or diamine (b) having a polyoxyalkylene chain is a polyether diol obtained by adding an alkylene oxide to a diol compound.

7. The antistatic agent according to claim 5, wherein the block copolymer is a copolymer having an (A)-(B)-(A) structure, an (A)-(B) structure, or both of these structures, composed of a block (A) derived from the polyolefin (a) having one end being acid-modified and a block (B) derived from the diol and/or the diamine (b) having a polyoxyalkylene chain being bonded together.

8. An antistatic agent containing a block copolymer having a structure of Formula (2)

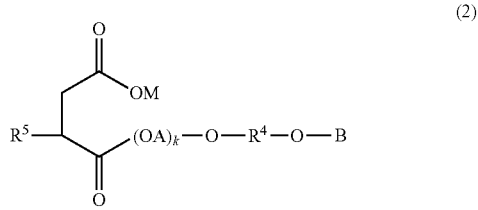

(2)

(where $R^4$ is a residue that results from removing a hydroxy group from a diol compound, A is a $C_{2-4}$ alkylene group, k is an integer of 1 to 100, $R^5$ is a polyolefin residue, and M is an alkali metal, an alkaline-earth metal, ammonium, or organic ammonium, and B is a hydrogen atom or a structure of Formula (3):

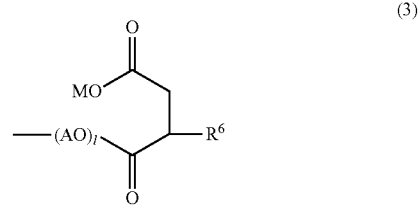

(3)

where A is a $C_{2-4}$ alkylene group, l is an integer of 1 to 100, $R^6$ is a polyolefin residue, and M is an alkali metal, an alkaline-earth metal, ammonium, or organic ammonium.

9. An antistatic resin composition comprising:
the antistatic agent according to claim 1; and
a thermoplastic resin.

10. The antistatic resin composition according to claim 9, wherein the thermoplastic resin is a polyolefin resin.

11. A film comprising the resin composition according to claim 9.

12. A sheet comprising the resin composition according to claim 9.

* * * * *